US007686930B2

(12) United States Patent
Sydlowski et al.

(10) Patent No.: US 7,686,930 B2
(45) Date of Patent: Mar. 30, 2010

(54) SECURE METER

(75) Inventors: Paul C. Sydlowski, Danvers, MA (US); Ronald M. Geis, Exeter, NH (US); Loren Edward Somes, Jr., Georgetown, MA (US)

(73) Assignee: Thermo Orion, Inc., Beverly, MA (US)

( * ) Notice: Subject to any disclaimer, the term of this patent is extended or adjusted under 35 U.S.C. 154(b) by 1402 days.

(21) Appl. No.: 11/065,780

(22) Filed: Feb. 25, 2005

(65) Prior Publication Data

US 2006/0191789 A1 Aug. 31, 2006

(51) Int. Cl.
*G01N 27/416* (2006.01)

(52) U.S. Cl. ........................ 204/406; 439/352; 439/357

(58) Field of Classification Search ................. 439/352, 439/357, 358; 204/400, 406
See application file for complete search history.

(56) References Cited

U.S. PATENT DOCUMENTS 4,687,271 A 8/1987 Szoboszlai et al.
5,106,327 A * 4/1992 McAnelly et al. ........... 439/651
5,268,632 A * 12/1993 Topping .................... 324/71.1
5,578,178 A * 11/1996 Nuzzio ....................... 204/413
5,997,361 A * 12/1999 Driscoll et al. .............. 439/701
6,096,275 A * 8/2000 Greenberg ............... 422/82.02
6,910,911 B2 * 6/2005 Mellott et al. ............... 439/358
2002/0074217 A1 6/2002 Goers et al.

* cited by examiner

*Primary Examiner*—Kaj K Olsen
(74) *Attorney, Agent, or Firm*—Cesari and McKenna, LLP

(57) ABSTRACT

A compact multiparameter instrument for electrochemical measurements is described. The instrument facilitates rapid engagement and disengagement of a variety of sensor elements in such a manner as to prevent accidental mismatch of sensor elements and sensor input ports. Positive identification of specific sensors is ensured by including color marking or other indicia on the sensor connectors that are matched to corresponding markings on the meter body. Measurements of specific parameters such as temperature may readily be shared among all other sensors connected to the instrument. A method of rapidly reconfiguring the instrument to provide extended or different capabilities is described.

10 Claims, 3 Drawing Sheets

SECURE METER

BACKGROUND OF THE INVENTION

1. Field of the Invention

The invention relates to meters and, more particularly, to meters for measuring a variety of parameters such as pH, dissolved oxygen, ionic conductivity, and the like.

2. Background Information

Electrochemical measurements are of significant importance in a wide variety of industries and applications. Thus, pH measurements are of significant and often of critical importance in medicine and biochemistry, as well as in food processing, pharmaceutical manufacturing, agriculture and other industries and applications. Measurements of the dissolved oxygen content of water are of importance in assessing the viability of lakes, streams, wells and other water containments. Measurement of the specific ion content of liquids with respect to a variety of ions such as chlorine, copper, nitrate, cyanide, and others is frequently essential to assessing water safety and potability.

Frequently, these measurements are made with instruments specific to a particular type of measurement, e.g., pH. Multiparameter instruments capable of measuring two or more parameters are known, but are commonly bulky and not simple to use.

Further, it is often necessary to make the desired measurements in field conditions, outside the laboratory environment. In the field, the instruments are exposed to a hostile environment, including exposure to contamination of the instrument by dirt, water invasion, and the like as a result of carelessness or accident, such as dropping.

In constructing a meter that can meet significant standards of accuracy, reliability and ruggedness, it is, of course, essential that the meter be competitive in the marketplace. Thus, efficient methods of constructing such a meter are of importance.

SUMMARY OF THE INVENTION

Accordingly, it is an object of the invention to provide an improved meter.

Further, it is an object of the invention to provide a meter for measuring various parameters in frequently unaccommodating environments.

Still a further object of the invention is to provide a meter to which various sensors may quickly and easily be connected, yet which is readily secured against inadvertent detachment of the sensors.

Further, it is an object of the invention to provide a meter which may be constructed economically yet readily adapted to perform a variety of electrochemical measurements.

In accordance with the present invention, a multiparameter meter is provided that enables a multiplicity of different types of electrochemical measurements. The meter is characterized by a comparatively small footprint and relatively light weight. It enables rapid attachment of a multiplicity of differing types of sensors in waterproof connections that are relatively secure against inadvertent disconnection. Protection is provided against inadvertent mismating of sensors and instrument jacks, and provision is made to facilitate association of a given connector with its corresponding jack. A flexible manufacturing arrangement facilitates rapid adaption of the meter to various sets of measurements.

BRIEF DESCRIPTION OF THE DRAWINGS

The foregoing and other and further objects and features of the invention will be more readily understood from the following detailed description of a preferred embodiment thereof, when taken in conjunction with the accompanying drawings, in which.

DETAILED DESCRIPTION OF AN ILLUSTRATIVE EMBODIMENT

Figure 1:
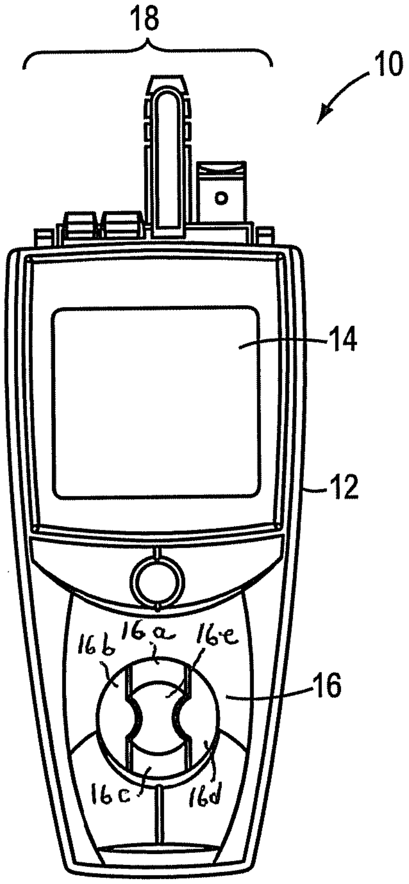
FIG. 1 is a plan view in perspective of a handheld meter in accordance with the present invention.
Figure 1A:
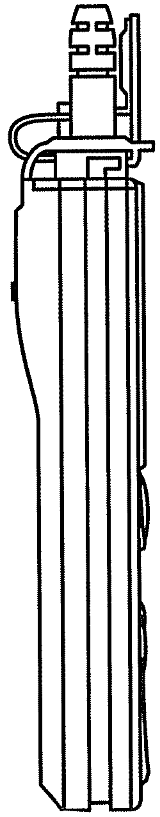
FIG. 1A is a side elevational view of the meter of FIG. 1.

Referring now to FIG. 1, a meter 10 in accordance with the present invention has a body 12 on which are located a display 14 and a keypad 16. The keypad has buttons **16*a*-16*e*** which enable entry of commands for specifying the type of measurement to be made and parameters associated with the measurement. The display presents to the user information concerning the measurements.

The meter 10 has a plurality of connector housings or ports 18 formed on a rear face thereof through which connection to external sensors are made. As shown in more detail in FIG. 2A, the housings **18*a*, 18*b*, 18*c*, 18*d* each surround and enclose a connector portion 20*a*. 20*b*, 20*c*, 20*d*, respectively. For ease of reference only, the connector portions 20*a-d* located on the body 12** will be referred to herein as "jacks", and the portions which mate with them will be referred to a "plugs", it being understood that either part of a two-piece connector may be mounted on the body as a jack, the other part then being referred to as a plug.

For reasons described more fully hereinafter, each connector portion is preferably of a different connector type. For example, in the preferred embodiment described herein, connector portion **20*a* is a locking BNC type connector, and is used for measuring pH via ion-selective electrodes; connector portion 20*b* is an 8-pin mini DIN connector, and is used for connection to sensors that measure temperature and conductivity; connector portion 20***c* is a 9-pin mini DIN connector, and is used for connection to sensors that measure dissolved oxygen, and pH via field-effect transistors (FETs); and connector portion 20*d* is an RN-232 type connector for carrying digital communications and power.

Figure 2:
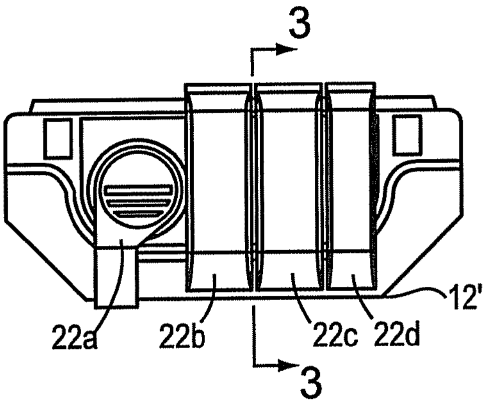
FIG. 2 is a rear elevational view of the meter of FIG. 1, shown with protective flaps engaged with the various connector housings.
Figure 2A:
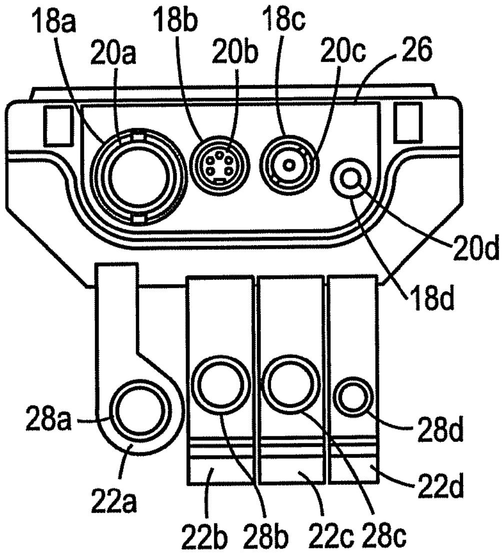
FIG. 2A is a rear elevational view of the meter of FIG. 1, shown with the protective flaps bent downwardly to expose the various connectors.
Figure 3:
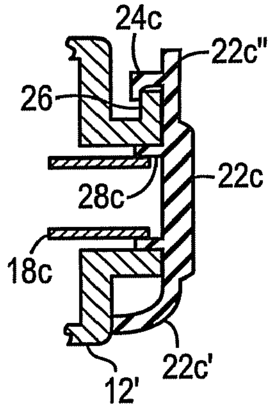
FIG. 3 is a cross-sectional view along the lines 3-3 of FIG. 2 showing the manner in which the protective flaps engage with a finger formed on the meter body to secure the flaps in place.

As shown in FIGS. 2A and 3, flaps 22 each have a grommet 28*a* which snugly engages its corresponding housing 18*a* to form a waterproof seal therewith. Flaps 22*b*, 22*c* and 22*d* each have an upper portion which engages a rail 26 on the meter body and a grommet 28*b*, 28*c*, 28*d*, respectively, intermediate the upper and lower portions which engage their corresponding housings 18*b*-18*d*. This may be seen more clearly in FIG. 3, which shows the meter body and an illustrative one of the flaps 22*b*-22*d*, specifically, flap 22*c*, in more detail. A lower portion 22*c*' of flap 22*c* is fixed to the bottom 12' of the meter body. An upper portion 22*c*" of flap 22*c*" carries thereon a finger 24*c*, which grasps the rail 26 on the meter body 12. The rail extends across at least a portion of the rear face of the body in at least the vicinity of the flaps 22 so as to be engageable by them. Advantageously, the rail is continuous along its extent but, of course, this is not necessary (for example, the rail may be crenellated), as long as a rail portion is provided for engagement with each flap. A grommet, e.g., grommet 28*c* of flap 22*c* in FIG. 3, is formed on each flap intermediate its ends 22*c*', 22*c*".

The flaps are formed of rubber or other flexible material, and are each independently movable between a disengaged position such as shown in FIG. 2A to an engaged position such as shown in FIG. 2. When the finger 24*c* of one of the flaps, such as flap 22*c*, engages the rail 26 of body 12, the grommet 28*c* of the flap engages and encloses its corresponding housing 18*c* and forms a watertight seal with it, thus protecting the connector jack within the housing from water and other contaminants. Flaps 22*b* and 22*d* are similarly constructed and function similarly, and thus need not be separately described.

Figure 4A:
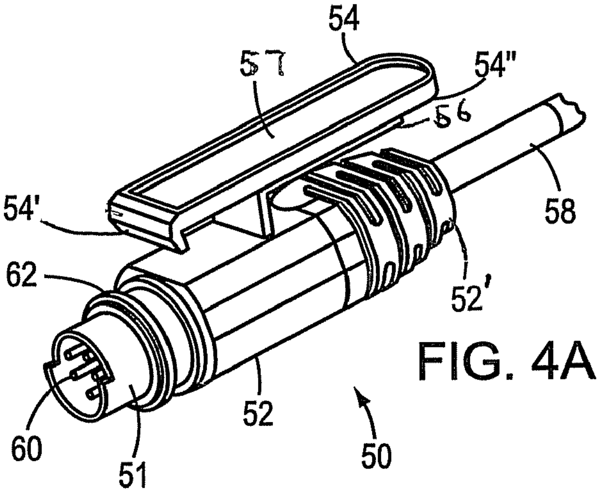
FIG. 4A is a view in perspective of a connector constructed in accordance with the present invention for connecting a first type of sensor to the meter of FIG. 1.

In FIG. 4A, an 8 pin mini DIN connector 50 in accordance with the invention is shown. A connector portion or plug 51 comprises a standard 8-pin mini DIN connector plug and is enclosed by overmolding it in a body 52, advantageously of a plastic material. The overmolding secures the connection of the connector jack to its cable and waterproofs this connection. For ease of reference, the plug 51 and body 52 are referred to collectively hererin as a connector. Body 52 has an arm 54 mounted thereon in cantilever fashion. The forward end of the arm terminates in a downwardly extending finger 54'; the rear end 54" of the connector forms a tab on which the user can push downwardly to raise the front end upwardly, as described below. A land 56 on the lower face of the tab limits movement of tab. The rear portion 52' of the connector housing is serraed to provide strain relief for the cord. An inset surface 56 may be formed on the upper face of the arm 54 to receive a label (not shown) providing information as to the specific form of sensor associated with the connector, its manufacturer, important data concerning its, use or other desired information or identification. An electrical cable 58 carries signals between the pins 60 of the connector plug 51 and a sensor or other electrical component (not shown). An O-ring 62 is carried on the forward face of the connector body surrounding the plug.

Connector 50 is designed for connection with a corresponding 8-pin jack on meter body 12, e.g., jack 20 *b* in FIG. 2B. A similar connector, but 9-pin instead of 8-pin, is then used to connect to its corresponding jack, e.g. jack 20*c* on body 12. Because of the difference in their pin count, the connectors cannot be inadvertently plugged into the wrong jack. This is quite beneficial when the meter is used outside the laboratory environment, where inattentive or inexperienced users could possibly damage the meter or the sensors connected to it by making the wrong connections to it.

Figure 4B:
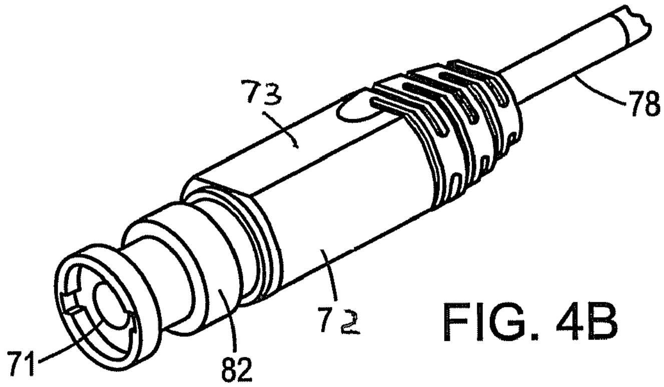
FIG. 4B is a view in perspective of a connector constructed in accordance with the present invention for connecting a second type of sensor to the meter of FIG. 1.

FIG. 4B illustrates a BNC-type connector in accordance with the present invention. The connector is formed from a standard BNC connector portion or plug 71 that is enclosed by overmolding in a body 72, advantageously of a plastic material. An inset surface 73 may be formed on the upper face of the body 72 to receive a label (not shown) providing information as to the specific form of sensor associated with the connector, etc. as described above in connection with connector 50. An electrical cable 78 carries signals between the plug 71 and a sensor or other electrical component (not shown). An O-ring 82 is carried on the forward face of the connector body surrounding the plug 71. Again, the overmolding secures and waterproofs the connection between the cable 58 and the connector plug. This is particularly beneficial in the case of BNC-type connectors, since the cable is normally secured to the connector plug by crimping, thus opening the possibility of water infestation. An O-ring further seals the connector to the meter body when inserted into its corresponding connector port, e.g., port 18*a* (FIG. 2A). Because BNC-type connectors include positive locking means, no separate locking arm, such as arm 54 on connector 50, is needed.

In similar fashion an RN-232 connector (not shown) having a plug is overmolded into a body for insertion into a plug, e.g., plug 18*d*, on body 12, for providing power and electrical communications.

Figure 5:
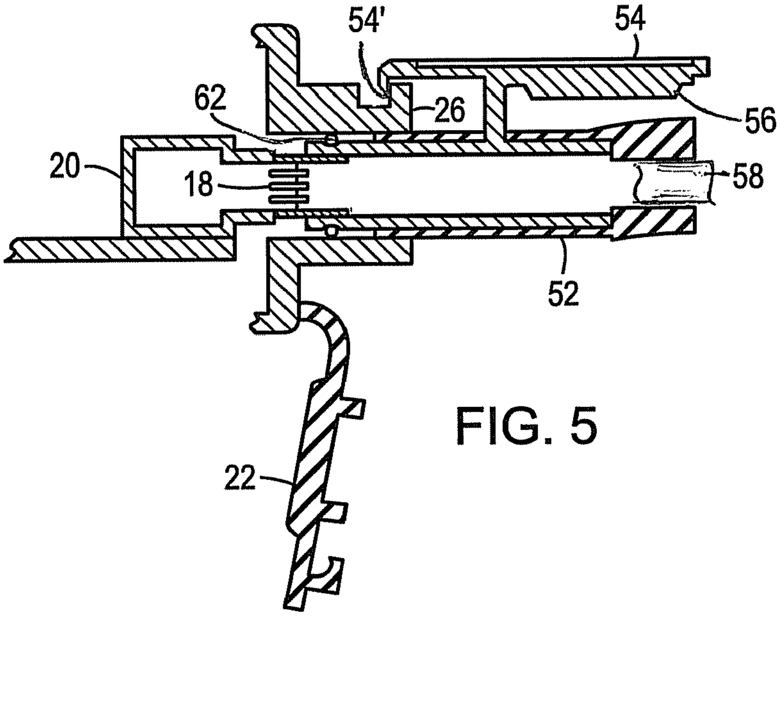
FIG. 5 is a side, sectional elevational view of the meter of FIG. 1, similar to that of FIG. 3, but with the protective flap of one of the connector housings disengaged from the housing and the connector of FIG. 4A inserted into the housing for mating with its corresponding connector component.
Figure 6:
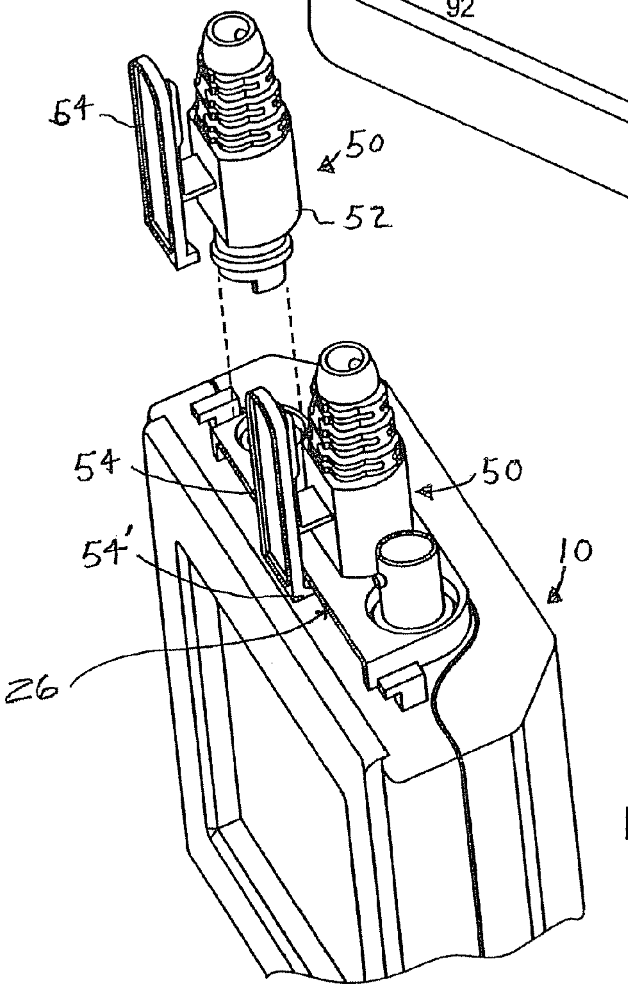
FIG. 6 is a view in perspective of the meter of FIG. 1 illustrating the manner in which the various connectors are readily secured to the meter body.

FIGS. 5 and 6 show the manner in which the connector 50 is engaged with the meter 10. A flap 22 is bent downwardly by the user to expose a housing 18 and thus a connector 20 jack within it. As the user moves the body 52 toward a connector housing to thereby engage the pins 60 of the connector plug with the corresponding connector jack within the housing, the O-ring 62 on the connector snugly engages the inside wall of the housing 20 to thereby form a waterproof seal between the connector and the housing. At the same time, the finger 54' of the arm 54 on the connector body 52 begins to move upwardly as it encounters the rail 26 of the meter body, and then snaps downwardly to firmly engage the rail and thus secure the connector (and its corresponding sensor) to the meter, thereby preventing, or at least hindering, inadvertent removal of the connector from the meter. To this end, the front surface 54' of the arm 54 is rounded or downwardly tapered (e.g., an inclined plane) to cause the arm to ride upwardly on the rail as the arm is pressed forwardly against it.

In order to subsequently remove the connector from the jack, the user simply presses down on the rear portion 54" of the arm 54 (see FIG. 4A) to thereby move the finger 54' above the rail 26 and disengage the two. The plug 51 can then be removed from the jack 18 by pulling back on the former to disconnect the two. The flap 22 can then be re-engaged with the rail 26, thereby sealing the jack housing in a waterproof manner. The land 56 limits the downward travel of the arm 54, thus limiting the strain on it when is flexed by the user to release it from the meter.

As noted above, each of the connectors are preferably of different type, thus ensuring that no two of the connectors can be mated to the same jack, thereby preventing possible damage to the meter or to the sensors. This could also be accomplished by providing different shapes for the connector bodies and corresponding shapes (e.g., round cross sections of differing diameters for the connector bodies and the corresponding connector ports; or differing cross-sections, such as square, round, hexagonal, etc. for the two.). If two or more of the connectors were of identical type and form, a sensor intended for one connector could inadvertently be connected into the other, resulting in the potential for significant damage to the meter, the sensors, or both.

Also as noted earlier, identifying indicia may be provided on the various connectors or even on the cables associated with the connectors. The indicia may be of a type that is matched to a corresponding indicator on the housings containing the respective connector jacks to which the external connector plugs are to be connected. For example, the connector bodies 52 may be color coded for the respective sensors they are to accommodate, and matching colors provided on the connector housings 20 or portions of the rail 26 adjacent the respective housings. Other indicia may be used in place of, or in addition to, color.

In making electrochemical measurements, the temperature of the liquid or other substance being measured is often of significant importance. Thus, in some measurements such as conductivity measurements, the temperature is commonly measured as well as the conductivity itself. Thus, in the present invention, when a measurement is performed which commonly requires a measurement of temperature as well, the temperature measurement is available simultaneously with the measurement of other parameters via sensors connected to any other port on the instrument without further effort.

The arrangement of connector ports described herein enables the construction of a compact, multiparameter instrument for electrochemical measurements. Further, the construction described herein facilitates rapid engagement and disengagement of a variety of sensor elements in such a manner as to prevent accidental mismatch of sensor elements and sensor input ports. Positive identification of specific sensors is ensured by including color marking or other indicia on the sensor connectors that are matched to corresponding markings on the meter body.

Figure 7:
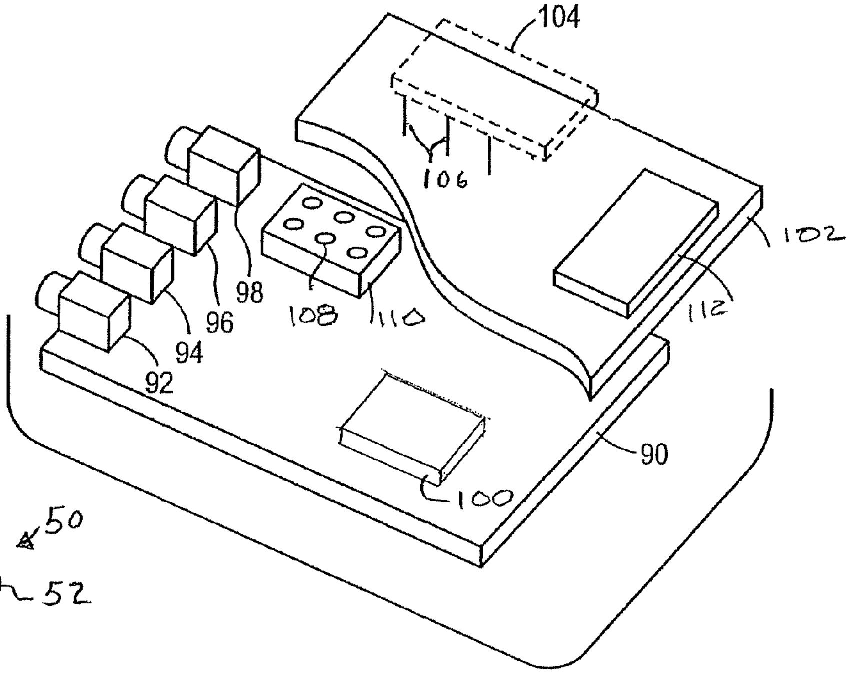
FIG. 7 is an exploded perspective view with parts broken away showing part of the FIG. 1 meter in greater detail.

Turning now to FIG. 7, an additional feature of the present invention is illustrated. In order to enable the efficient manufacture of meters providing different combinations of measurement capabilities, we form the basic meter system on a printed circuit board 90 which fits into the meter body 12. The board 90 caries connector blocks 92-98 which in turn carry the respective connector jacks 20*a*-20*d* shown in FIG. 1. Integrated circuit components such as component 100 in FIG. 7 mount on the board 90 and electrically connect to the jacks 20 by carrying signals to and from the jacks as well as to and from other components (not shown) on the board.

The components 100 provide various measurement and control capabilities to the instrument. To extend these capabilities, or to change them, one or more additional boards 102 are provided. Board 102 carries a first interconnect segment 104 (shown in chain-link lines since it is mounted on the underside of the board) with connector pins 106 extending downwardly therefrom. The pins 106 fit into electrical receptacles 108 in a connector 110 mounted on board 90. Additional components such as integrated circuit 112 are mounted on board 102 and electrically communicate with the components 100 and connectors 20*a-d* on board 90 through the interconnect 104.

The arrangement described enables the capabilities of the basic meter to be changed or extended as desired in order to accommodate different measurements. The added board may extend the capabilities of the basic board or may provide entirely different capabilities. Thus, the same basic meter body can serve for handling a wide variety of measurements and measurement capabilities. The change may be made quickly and easily during the manufacturing process, or subsequently.

What is claimed is:

1. A meter assembly comprising a handheld meter including a hollow meter body defining a substantially flat surface area, a display mounted to a face of said body, a circuit board in said body for controlling the display in response to sensor signals, a plurality of electrical jacks disposed next to one another in said surface area, each jack being connected electrically to said circuit board, and a rail extending along the meter body at one side of said surface area, and at least one connector plugged into one of said jacks, each connector including a connector body encompassing a connector element and at least one conductor connecting the connector element to a sensor for carrying sensor signals between said sensor and said circuit board, and a resilient lever arm movably secured to an exterior surface of the connector body in line therewith, said arm having a finger at one end thereof which engages under said rail when said at least one connector is plugged into said one of said jacks and a digit-engageable portion at the other end of said arm which when moved toward the connector body releases the finger from said rail enabling removal of said at least one connector from said one of said jacks.

2. The meter assembly according to claim 1 and further including a corresponding plurality of cover flaps connected to the meter body on the other side of said surface area, each cover flap being hinged to the meter body along a line extending parallel to said rail and being movable between a first position wherein it covers the corresponding jack and a second position wherein it exposes the corresponding jack.

3. The meter assembly according to claim 1 which includes means on said at least one connector for associating said at least one connector with said one of said jacks.

4. The meter assembly according to claim 3 in which said means comprises a color coding on said at least one connector matched to a color coding on said one of said jacks.

5. The meter assembly according to claim 1 in which said connector element is a multi-pin DIN connector.

6. The meter assembly according to claim 1 in which said connector element is a BNC connector.

7. The meter assembly according to claim 1 including a plurality of additional connectors plugged into others of said plurality of jacks for connecting additional different sensors to said circuit board.

8. The meter assembly according to claim 1 in which said plurality of jacks includes at least a pair of jacks of different types, so as to preclude inadvertent connection of a sensor of one type to a jack intended to accommodate a sensor of another type.

9. The meter assembly according to claim 1 in which said plurality of jacks includes at least a pair of jacks of different shapes so as to preclude inadvertent connection of a sensor of one type to a jack intended to accommodate a sensor of another type.

10. A meter assembly providing a secure connection to a plurality of sensor elements, said meter assembly comprising a handheld meter, said meter including a meter housing defining a substantially flat surface, a display mounted to a face of the housing, a circuit board in said housing for controlling the display in response to sensor signals, a plurality of electrical jacks disposed next to one another in said surface area, each jack being connected electrically to the circuit board, a rail extending along said meter housing at one side of said surface area, and a corresponding plurality of cover flaps connected to the meter body on the other side of said surface area, each cover flap being hinged to the meter body along a line extending parallel to said rail and being movable between a first position wherein it covers the corresponding jack and a second position wherein it exposes the corresponding jack, and at least one connector plugged into one of said jacks when the cover flap associated with that jack is in its said second position, each said connector encompassing a connector element and at least one conductor connecting the connecting element to a sensor for carrying sensor signals between said sensor and said circuit board, and a resilient lever arm movably secured to the exterior of said connector body in line therewith, said arm including a finger at one end which engages under said rail when said at least one connector is plugged into said one of said jacks.

* * * * *